T. J. CALL.
FASTENER FOR FURNITURE.
APPLICATION FILED JAN. 29, 1909.
962,939.
Patented June 28, 1910.
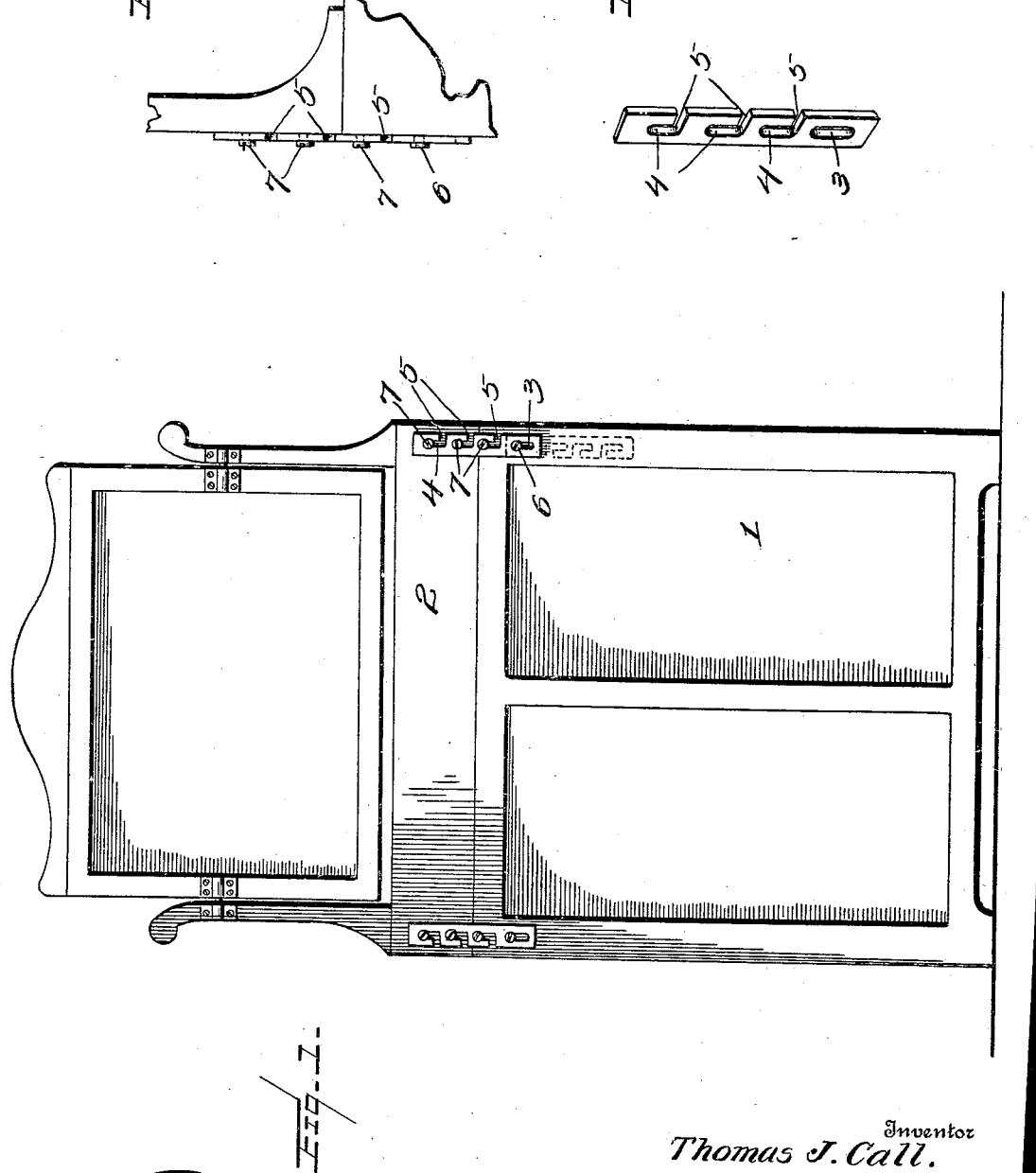
Inventor
Thomas J. Call.
By Victor J. Evans
Attorney
Witnesses

UNITED STATES PATENT OFFICE.

THOMAS J. CALL, OF DANVILLE, ILLINOIS, ASSIGNOR OF FOUR-TENTHS TO WILLIAM T. LEVERENZ, OF DANVILLE, ILLINOIS.

FASTENER FOR FURNITURE.

962,939.

Specification of Letters Patent. Patented June 28, 1910.

Application filed January 29, 1909. Serial No. 474,905.

*To all whom it may concern:*

Be it known that I, THOMAS J. CALL, a citizen of the United States of America, residing at Danville, in the county of Vermilion and State of Illinois, have invented new and useful Improvements in Fasteners for Furniture, of which the following is a specification.

This invention relates to fasteners for furniture, and one of the principal objects of the same is to provide simple, reliable and efficient means for holding together the two parts of a dresser or other piece of furniture in which the two sections are detachable.

Another object of the invention is to provide a connector or fastener for the purpose referred to which shall be permanently connected to one of the sections and which can be readily connected to the other section without the use of tools.

Still another object of my invention is to provide a fastener or connector which while secured to one member of the piece of furniture is flat, does not have any projecting portions liable to injure the wall or to become disabled by contact with other articles.

These and other objects may be attained by means of the construction illustrated in the accompanying drawing, in which,—

Figure 1 is a view in elevation looking at the rear of a dresser, showing my fastener or connector in position thereon to connect the two sections of said dresser. Fig. 2 is a detail edge view of a portion of the two sections of a piece of furniture connected together by my fastener or connector. Fig. 3 is a perspective view of the connector or fastener detached from the furniture.

Referring to the drawing, the numeral 1 designates the lower member of a dresser, and 2 is the top or upper edge thereof. These two members are detachable, one from the other, as usually manufactured, and some means must be provided for holding the upper section firmly in place upon the lower one.

My fastener or connector consists of a flat piece of metal provided near one end with a slot 3. Formed in the connector in line with the slot 3 is a series of slots 4 having angularly disposed branch slots 5 extending from the slots 4 out of the edge of the plate. The connector is pivotally attached to the member 1 by means of a headed screw 6 extending through the slot 3, the head of said screw being sufficiently large to prevent the detachment of the connector except upon turning out the screw. A series of headed screws 7 are secured to the two sections 1 and 2 of the dresser in vertical alinement with the screw 6.

In connecting the two sections 1 and 2 the connector is moved upon the pivotal screw 6 until all the screws 7 come into line with the branch slots 5. Then the connector is moved until all the slots 4 are in alinement with the screws 7. Then the connector is pushed downward until the screw 6 occupies the upper end of the slot 3. In this position the two sections 1 and 2 are firmly held connected and by a device which will occupy but little room and is not provided with projections liable to injure the wall or to become injured by striking other articles. When it is desired to disconnect the sections 1 and 2 by an upward movement of the connector, the latter can be swung upon the pivot screw 6 to the dotted line position shown at the right of Fig. 1, entirely out of the way and always in position for future use.

From the foregoing it will be obvious that my connector may be used upon all classes of furniture comprising two members to be connected together for use and which will permit each section to be independently handled for moving or shipping.

I claim:—

The combination with a dresser or like article of furniture, comprising a body and a detachable top section, of rows of headed studs upon said body and top section at opposite sides thereof, and connectors engaging said studs, each connector comprising an oblong rectangular plate of uniform width provided at one end with a closed longitudinal slot slidably and pivotally engaging one of said studs and having a series of longitudinal slots in alinement with said closed slot to engage the other studs, each of the longitudinal slots of the series being formed with a branch slot extending from one end thereof to and through one of the longitudinal edges of the plate, all of said slots being spaced equidistantly from the longitudinal edges of the plate.

In testimony whereof I affix my signature in presence of two witnesses.

THOMAS J. CALL.

Witnesses:
    THOS. A. GRAHAM,
    NELL GARDNER.